Dec. 7, 1948.    R. A. JOHNSON    2,455,773
ELECTRIC CABLE
Filed July 23, 1946
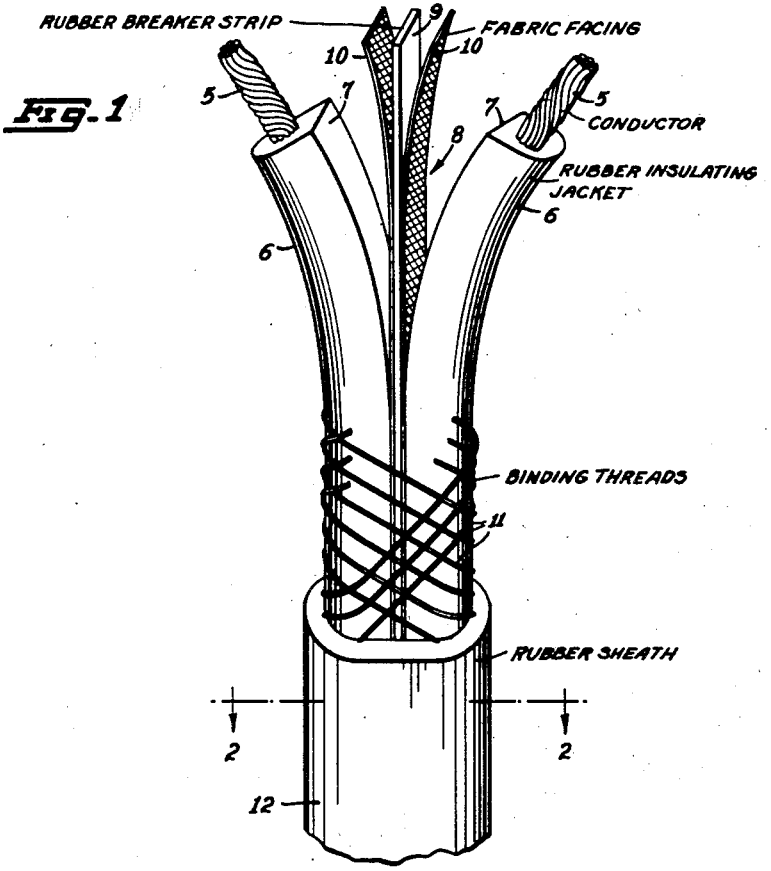
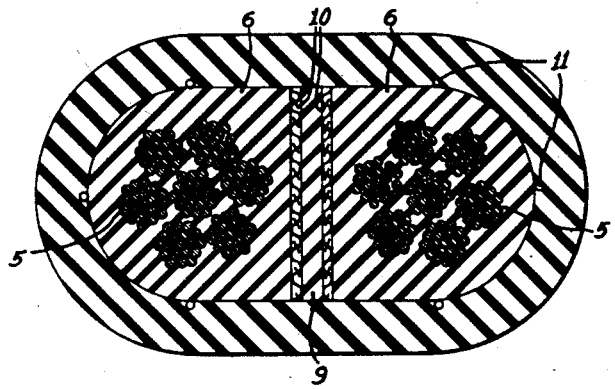
INVENTOR
Richard A. Johnson
BY
ATTORNEYS Patented Dec. 7, 1948

2,455,773

UNITED STATES PATENT OFFICE 2,455,773

ELECTRIC CABLE

Richard A. Johnson, Marion, Ind., assignor to Anaconda Wire and Cable Company, a corporation of Delaware Application July 23, 1946, Serial No. 685,581

7 Claims. (Cl. 174—117)

This invention relates to electric cables, and is directed particularly to the provision of an improved cable of exceptionally sturdy mechanical construction rendering it especially suitable for the severe service to which mining equipment power supply cables are subjected. The new cable comprises individually jacketed conductors separated by a breaker strip of improved design and enclosed within a protective sheath. The cable components are securely bonded together to prevent lateral or longitudinal separation even when the cable is subjected to severe deforming forces.

In recent years mobile electrically operated mining machinery has come into extensive use, particularly in coal mines. Modern mining machinery of this character often is designed so as not to require a trolley or third rail to supply the electric power by which it is operated. Instead, the machine is equipped with a flexible power supply cable carried on a cable reel, and the cable trails out behind the machine to some point in the rear where it is connected to a permanent electric power supply line. As the machine advances, cable passes out from the cable reel, and when the machine retreats the cable is wound back on the reel.

The cable used in mining machines of this character is subjected to extremely severe mechanical service. That part of the cable which trails out behind the machines lies on the floor of the mine or other working space where it is subject to being walked upon, run over by other machines, and otherwise abused. The cable is paid out from the cable reel of the machine, and wound back upon it, through a guide. If the cable has been bent or twisted very much while trailing behind the machine, it is subjected to severe and often jerky tensile and shear forces when it is pulled through the guide to be wound back upon the reel, and subsequently when it is again paid out from the guide through the reel. Friction forces alone sometimes impose severe forces of this character on the cable when it is paid out or reeled back. A cable of exceptionally sturdy mechanical construction is required to withstand this severe service.

Besides mechanical strength, a cable for this service must be exceptionally well insulated. Often the floor of the mine or other working space on which the cable lies when it trails out behind the machine is damp, and the cable must not be affected thereby. The mechanical abuse to which the cable is subjected is by itself likely to cause short circuits unless sturdy insulation is provided. This danger is increased by the fact that the cable usually must contain two or more conductors which operate at a considerable potential difference.

The cable must of course be sufficiently flexible to permit being paid out and wound back upon the cable reel.

Even the best cables heretofore available have not performed well in this hard service. A useful operating life of only a few months is typical, and there have been instances where even some of the best cable heretofore available has stood up for only a few weeks.

The present invention provides an improved well-insulated cable of exceptionally durable construction which has proved to be well suited for the severe service encountered in the operation of electric mining machinery. The new cable generally comprises two or more conductors each surrounded by an individual rubber jacket, and together enclosed within a rubber sheath. A breaker strip comprising a strip of rubber faced on each side with a layer of fibrous material, such as cotton fabric, extends the length of the cable between the jacketed conductors. The edges of the breaker strip extend into contact with the sheath and are firmly bonded to it. Adhesive also bonds the sheath to the individual conductor jackets, and bonds these jackets to the breaker strip. The breaker strip, especially when it comprises fabric facings, is highly effective for preventing a short circuit from being created between the conductors when the cable is subjected to severe mechanical distortion. The adhesive bonding of the sheath, conductor jackets, and breaker strip together effectively welds all of the cable components into a particularly strong and durable assembly, and prevents separation of the cable components even when the cable is subjected to severe tensile, torsional or shear forces. The mechanical strength which results from this construction greatly reduces the likelihood that mechanical abuse will cause accidental short circuits, or will cause other injury to the cable, such as stripping of the sheath from the jacket as it is paid out from or wound back upon a cable reel through a guide, which would render the cable unsuitable for further use.

A particularly advantageous form of cable embodying the foregoing and other features is described in detail below with reference to the accompanying drawings, in which Fig. 1 is a perspective showing the construction of a cable made in accordance with the invention; and Fig. 2 is a cross section through a cable of the character shown in Fig. 1.

The cable shown in the drawings comprises two stranded metallic conductors 5 each encased in its individual rubber jacket 6. The jacket advantageously is formed by extrusion of the rubber about the conductor. The rubber jackets 6 are D-shaped in cross section, with their flat faces 7 adjacent and facing toward each other.

A breaker strip 8 extends the length of the cable between the jacketed conductors. The breaker strip comprises a central strip 9 of rubber, of appreciable thickness, faced on each side with a layer 10 of fibrous material such as a textile fabric. The breaker strip may advantageously be formed of two thicknesses of fabric-backed rubber tape, the two thicknesses of tape being cemented or otherwise bonded together with their rubber surfaces adjoining.

For convenience in manufacturing the cable, the assembly of jacketed conductors and breaker strip may be bound together by binding threads 11. The binding threads serve to hold the components of the assembly in their proper relative positions prior to extruding or otherwise forming about them an outer protective rubber sheath 12. This sheath permanently holds the cable assembly together.

The breaker strip 8 is of substantially the same width as the flat faces 7 of the D-shaped conductor jackets, and consequently the edges of the breaker strip adjoin the inner surface of the sheath 12. The assembly of D-shaped conductor jackets and breaker strip presents a substantially smooth outer surface, so that substantially the entire inner surface area of the protective sheath 12 is in contact therewith.

In assembling the cable, a film of rubber cement or other adhesive is applied between the adjoining surfaces of the conductor jackets and the breaker strip, and between the adjoining surfaces of the sheath, the conductor jackets, and the edges of the breaker strip. This adhesive serves to bond the conductor jackets, breaker strip, and the sheath firmly together, and prevents any separation of the several components of the cable when it is subjected to strong deforming forces.

In the completed cable, the breaker strip provides very effective protection against short circuits when the cable is subjected to very severe torsional, shear, tensile or compressive forces such as may occur when the cable is trampled upon or run over by a vehicle. Instances are known where cables of this general character not equipped with a breaker strip have, when thus abused, developed a short circuit which almost immediately burned its way along a great length of the cable, completely ruining it. The fabric layers 10 with which each side of the breaker strip 8 is faced not only provide mechanical strength enabling the cable to withstand very substantial mechanical abuse without a short circuit developing between the conductors, but further have been found to be effective for preventing any short circuit that may develop under such conditions from travelling along the cable and ruining any great length of it. Any fibrous facing on the breaker strip 8 effectively improves its operation. Very satisfactory results have been obtained using a cotton duck or other cotton fabric as the facing material.

The adhesive bond between the breaker strip and the conductor jackets serves to prevent any lateral displacement of either conductor jacket relative to the breaker strip. The breaker strip therefore is held at all times, even when the cable is subjected to severe distorting forces, in its proper position between the jacketed conductors, where it must remain in order to provide maximum protection against development of short circuits.

The breaker strip further is held in its proper position between the conductor jackets by being of substantially the same width as the flat faces of the D-shaped conductor jackets and by being adhesively bonded to the sheath 12.

The adhesive bond between the sheath, the conductor jackets, and the breaker strip enables the sheath to constitute a reinforcing element for the entire assembly. In addition, this adhesive bond presents longitudinal or lateral slipping of the sheath over the inner components of the cable assembly. There have been instances where mining machine cable sheaths have been stripped from the cable because of the high friction developed between the cable guide and the sheath when the cable was rewound rapidly on to the cable reel and a sharp bend or other deformed section of the cable became caught in the guide. Such damage to the cable makes it unsuitable for further use even though a short circuit may not immediately develop. The adhesive bond between the sheath and the inner components of the new cable serves to make it impossible for the sheath to be accidentally stripped from the cable, even when the cable is severely abused. With a cable of the character shown in the drawings, wherein substantially the entire surface area of the sheath is in contact with and adhesively bonded to the inner components of the cable, the cable will in most instances break before the sheath will strip from it accidentally.

The cable has been described above with particular reference to rubber conductor jackets, a rubber-core breaker strip, and a rubber outer sheath. Rubber (either natural or synthetic) is in fact the material presently preferred for use in the manufacture of these components of the new cable. However, mechanically strong and durable cables may be made in accordance with the invention using other flexible insulating compounds (pliable resinous and plastic compounds such as vinyl polymers and polyethylene polymers, for example) for making these elements, and such materials are therefore to be considered as the equivalents of rubber in the cable as herein described and claimed.

While the cable shown in the drawings and particularly described above is a two-conductor cable, it is of course evident that the same principles of construction that characterizes the new cable may be embodied in multi-conductor cables containing three or more conductors.

The new cable can be made adequately flexible to permit it to be wound on and unwound from a cable reel of rather small diameter, and yet it may retain sufficient stiffness so as not to be subject to kinking. The adhesive bonds between the several components contribute significantly to this latter quality. When rubber or equally waterproof material is employed in the manufacture of the conductor jackets and sheath, the cable is easily able to withstand exposure to the dampness that often prevails in underground mines. The mechanical strength and general sturdiness which enables the new cable to withstand abuse that would cause short circuits in cables heretofore known makes it a particularly safe cable to employ where fire hazards are serious, as in coal mines, and where workmen are likely to come accidentally in contact with it. The foregoing properties of the new cable not only make it well suited for use in supplying power to mining machinery, but also make it valuable for other services where severe conditions prevail and where a mechanically strong, durable, flexible and moisture-resistant cable is required.

I claim:

1. An electric cable comprising two conductors, an individual rubber jacket surrounding each conductor, a rubber sheath enclosing the jacketed conductors, and a breaker strip comprising a strip of rubber faced on each side with a layer of fibrous material extending the length of the cable between the jacketed conductors, the edges of said breaker strip extending into contact with and being firmly bonded to the rubber sheath.

2. An electric cable comprising two conductors, an individual D-shaped rubber jacket surrounding each conductor, said jacketed conductors being arranged parallel with their flat faces adjacent each other, a breaker strip comprising a strip of rubber faced on each side with a layer of fibrous fabric material extending lengthwise of the cable between the jacketed conductors, and adhesive firmly bonding the fabric faces of the breaker strip to the flat faces of the conductor jackets to prevent lateral separation of these elements under severe torsional or shear forces applied to the cable.

3. An electric cable comprising two conductors, an individual rubber jacket surrounding each conductor, a rubber sheath enclosing the jacketed conductors, a breaker strip comprising a strip of rubber faced on each side with a layer of fibrous material extending the length of the cable between the jacketed conductors, the edges of said breaker strip extending into contact with the rubber sheath, and adhesive firmly bonding the sheath to the conductor jackets and to the edges of the breaker strip to prevent separation of these elements under severe tensile, torsional or shear forces applied to the cable.

4. An electric cable comprising two conductors, an individual D-shaped rubber jacket surrounding each conductor, said jacketed conductors being arranged parallel with their flat faces adjacent each other, a breaker strip comprising a strip of rubber faced on each side with a layer of fibrous fabric material extending lengthwise of the cable between the jacketed conductors, a rubber sheath enclosing the jacketed conductors and the breaker strip, and adhesive firmly bonding the fabric faces of the breaker strip to the adjacent flat faces of the conductor jackets and firmly bonding the sheath to the conductor jackets and to the edges of the breaker strip to prevent separation of the several elements under severe tensile, torsional or shear forces.

5. In a cable comprising a pair of rubber-jacketed conductors arranged side by side, means for preventing creation of a short circuit between the conductors when the cable is subjected to severe mechanical distortion comprising a breaker strip in the form of a rubber strip faced on each side with fabric positioned between the jacketed conductors and adhesively bonded thereto.

6. In a cable comprising a pair of conductors each enclosed in an individual D-shaped rubber jacket and arranged parallel with the flat faces of the jackets facing each other, means for preventing creation of a short circuit between the conductors when the cable is subjected to severe mechanical distortion comprising a breaker strip in the form of a rubber strip faced on each side with fabric and of width at least about as great as the width of the flat faces of conductor jackets, said breaker strip being positioned between the conductor jackets and having its fabric facings adhesively bonded to the adjacent flat faces thereof.

7. In a cable comprising a pair of rubber-jacketed conductors enclosed with a protective rubber sheath and separated by a breaker strip comprising a strip of rubber, having a facing of fibrous fabric material adhesively secured to each side thereof, the improvement which comprises a film of adhesive strongly bonding the sheath to each conductor jacket and to the edges of the breaker strip and preventing longtiudinal separation of the cable components even when the cable is subjected to severe deforming forces, and films of adhesive strongly bonding the fabric facings of the breaker strip to each of the conductor jackets and preventing lateral separation of the cable components even when the cable is subjected to severe deforming forces.

RICHARD A. JOHNSON.

REFERENCES CITED

The following references are of record in the file of this patent:

UNITED STATES PATENTS

| Number | Name | Date |
|---|---|---|
| 286,829 | Kohmescher | Oct. 16, 1883 |
| 1,458,803 | Burley et al | June 12, 1923 |
| 1,698,704 | Middleton et al | Jan. 8, 1929 |
| 1,957,487 | Buckley et al. | May 8, 1934 |
| 1,977,209 | Sargent | Oct. 16, 1934 |
| 1,998,817 | Meyer | Apr. 23, 1935 |

FOREIGN PATENTS

| Number | Country | Date |
|---|---|---|
| 153,118 | Switzerland | May 16, 1932 |
| 834,955 | France | Sept. 12, 1938 |

Certificate of Correction

Patent No. 2,455,773.  December 7, 1948.

RICHARD A. JOHNSON

It is hereby certified that errors appear in the printed specification of the above numbered patent requiring correction as follows:

Column 3, line 7, for the word "jacket" read *jackets*; line 43, after "strip" strike out the comma and insert instead a period; column 6, line 25, claim 7, for "with" read *within*;

and that the said Letters Patent should be read with these corrections therein that the same may conform to the record of the case in the Patent Office.

Signed and sealed this 5th day of April, A. D. 1949.

[SEAL]

THOMAS F. MURPHY,
*Assistant Commissioner of Patents.*